United States Patent [19]

Sawaguchi et al.

[11] Patent Number: 5,287,228
[45] Date of Patent: Feb. 15, 1994

[54] PEAK DETECTION METHOD AND APPARATUS THEREFOR

[75] Inventors: Hideki Sawaguchi, Kodaira; Yasuhide Ouchi, Kodaira; Hajime Aoi, Tachikawa, all of Japan

[73] Assignee: Hitachi, Ltd., Tokyo, Japan

[21] Appl. No.: 738,627

[22] Filed: Jul. 31, 1991

[30] Foreign Application Priority Data

Aug. 1, 1990 [JP] Japan .................. 2-202440

[51] Int. Cl.⁵ .............................................. G11B 5/02
[52] U.S. Cl. .......................................... 360/57; 360/46
[58] Field of Search ............... 360/57, 46, 66, 43, 360/67, 51, 77.08, 78.04, 55, 48, 119, 78.01, 78.02; 307/358; 369/44.26, 44.34, 44.38

[56] References Cited

U.S. PATENT DOCUMENTS

| | | | |
|---|---|---|---|
| 4,227,175 | 10/1980 | Newman | 340/146.2 |
| 4,644,564 | 2/1987 | Dolivo et al. | 375/18 |
| 4,755,891 | 7/1988 | Katoh et al. | 360/67 |
| 4,769,597 | 9/1988 | Sano | 307/358 X |
| 5,170,299 | 12/1992 | Moon | 360/77.08 |

OTHER PUBLICATIONS

"An Event-driven Maximum-Likelihood Peak Position Detector for Run-Length-Limited Codes in Magnetic Recording", IEEE Transactions on Magnetics, vol. MAG-17, No. 6, pp. 3337-3339, 1991.

"Signal Processing for High-Density Digital Magnetic Recording", IEEE, 1989, pp. 1-91-96.

Primary Examiner—Robert J. Pascal
Assistant Examiner—Ali Neyzari
Attorney, Agent, or Firm—Fay, Sharpe, Beall, Fagan, Minnich & McKee

[57] ABSTRACT

The time interval/amplitude level difference between sequential peaks in waveforms of first reproducing signals from a recording medium is detected and stored in a storage. The time interval/amplitude level difference between peaks in a waveform of a second reproducing signal from the recording medium is detected and compared with the time interval/amplitude level difference stored in the storage to thereby perform peak detection in the waveforms thereof. An original bit train of the first reproducing signal corresponding to a maximum-likelihood waveform selected among the waveforms of the first reproducing signals is given as a standardized signal. Data are provided to represent the time interval/amplitude level difference between the sequential peaks in the waveforms of the reproducing signals in a range of electromagnetic signal interference on the recording medium.

35 Claims, 14 Drawing Sheets

FIG. 1A PRIOR ART
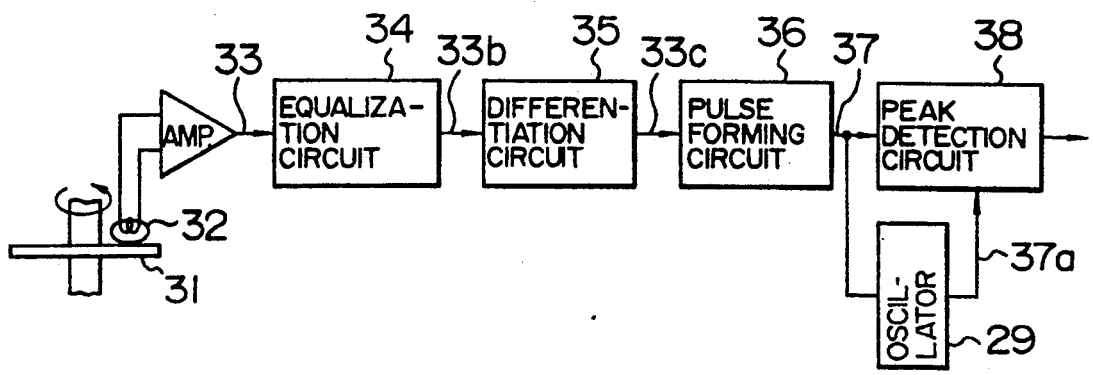
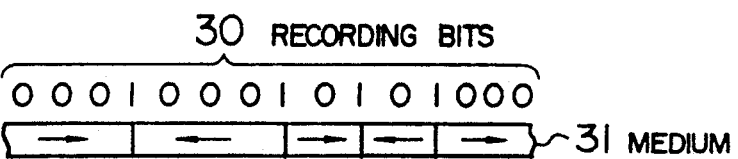
FIG. 1B PRIOR ART
FIG. 1C PRIOR ART
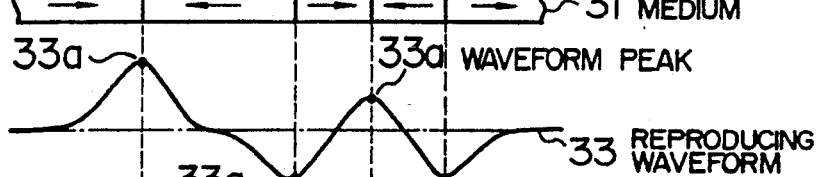
FIG. 1D PRIOR ART
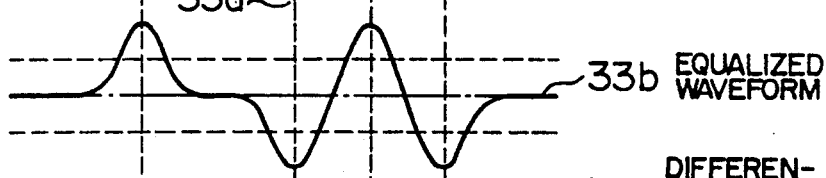
FIG. 1E PRIOR ART
FIG. 1F PRIOR ART
FIG. 1G PRIOR ART
FIG. 1H PRIOR ART
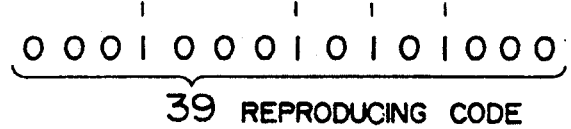

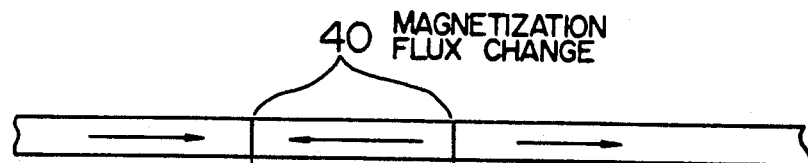
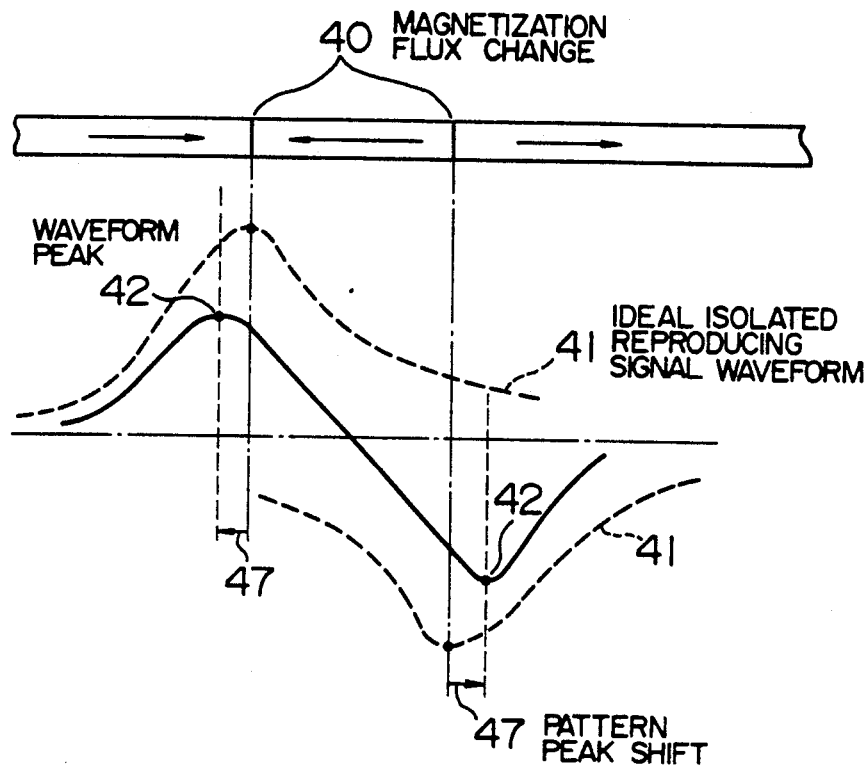
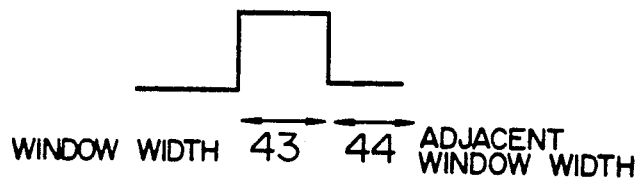
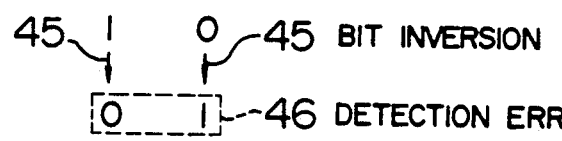
DIAGRAM FOR EXPLANNING PROBLEM IN
BIT ERROR DUE TO PATTERN SHIFT

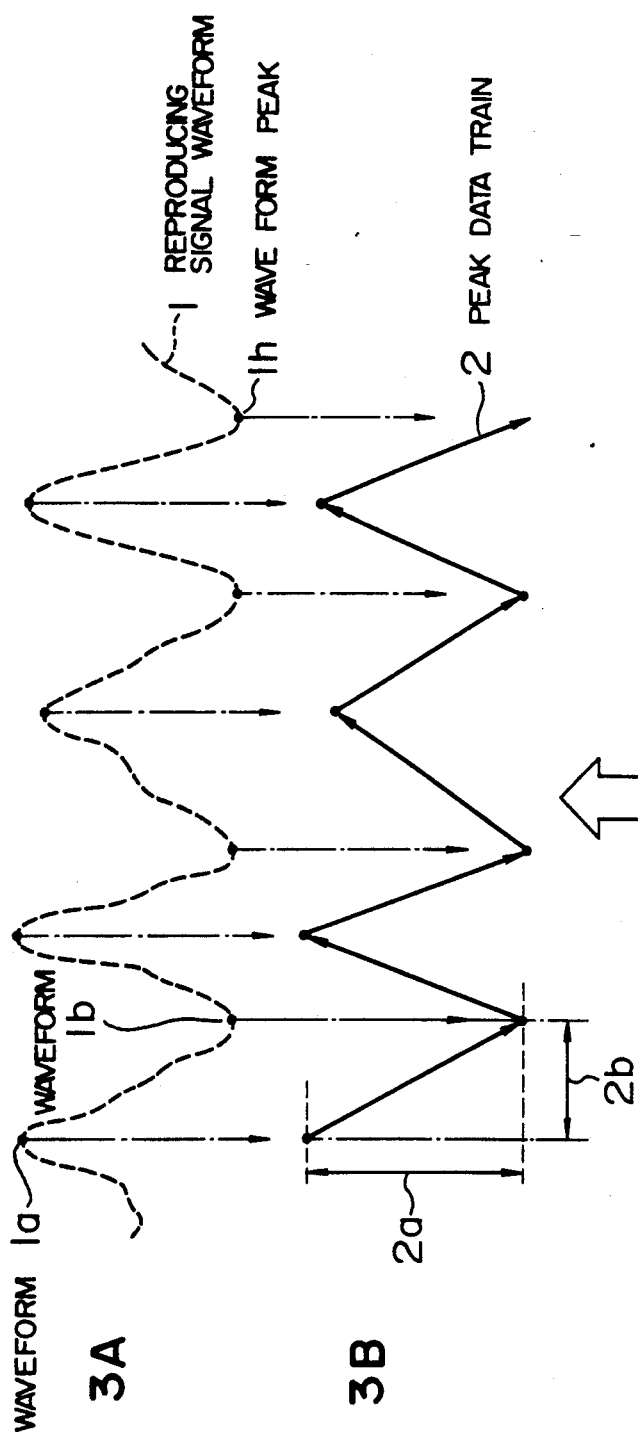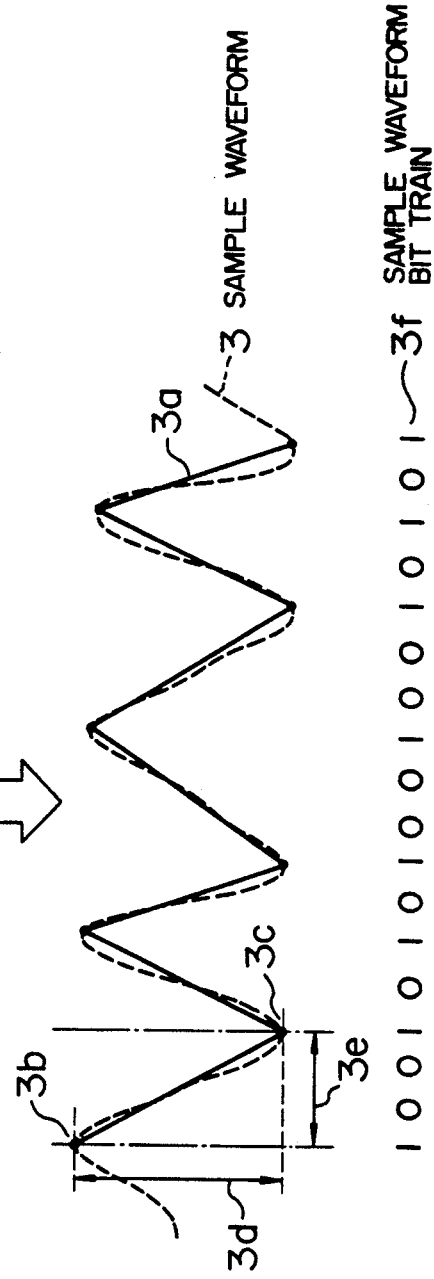

SIMULATION COMPARISION DIAGRAM OF NOISE PERFORMANCE 0 1 0 0 1 0 0 0 1 0 0 1 0

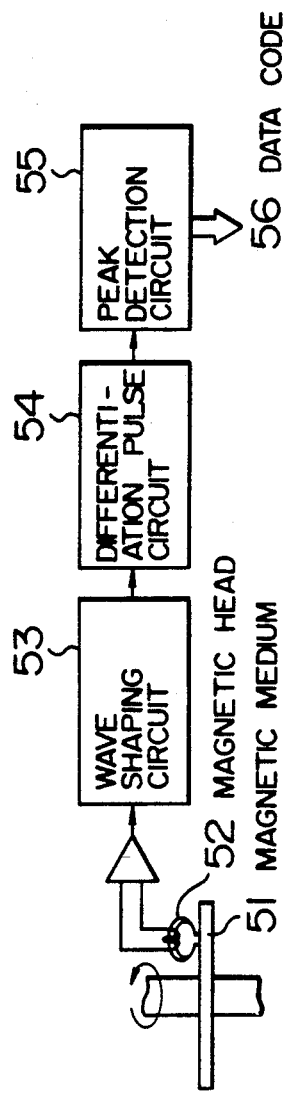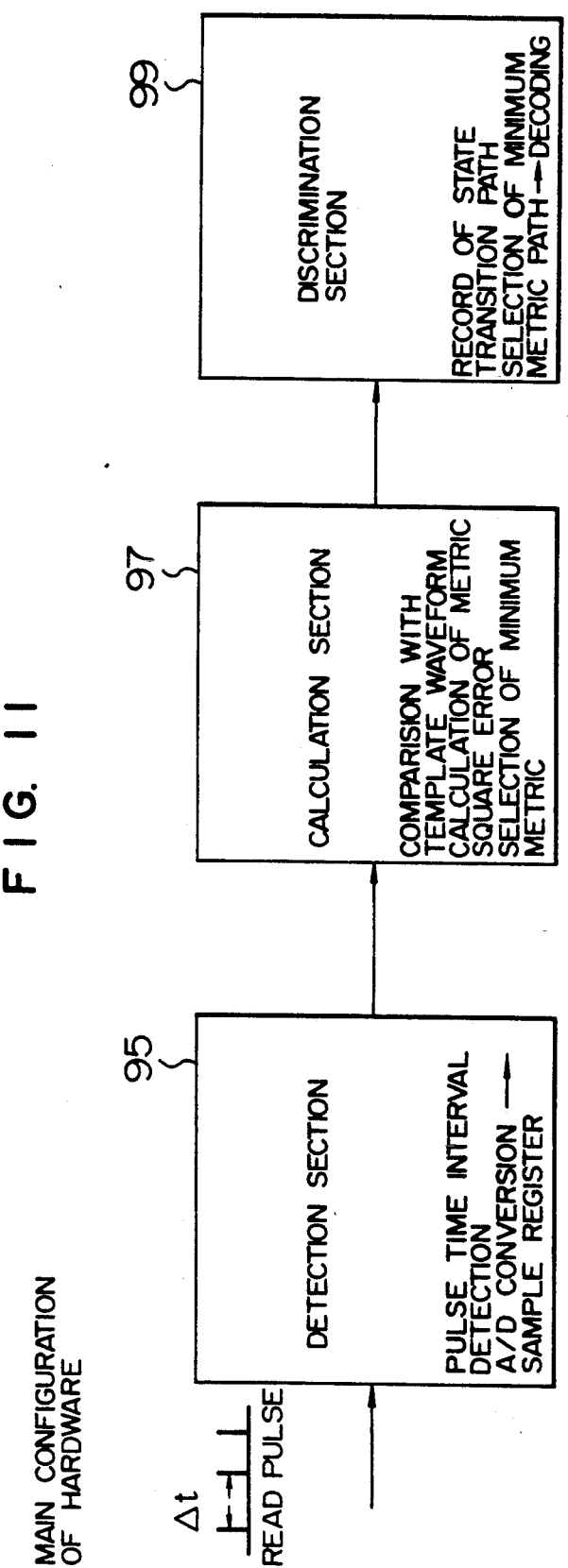

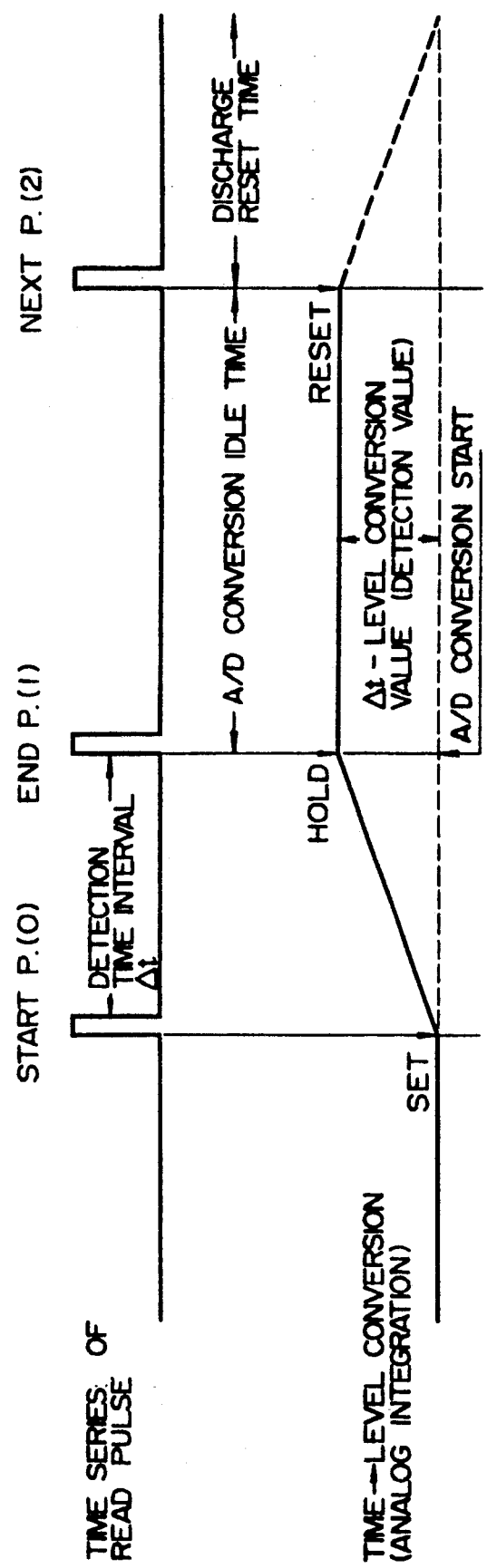

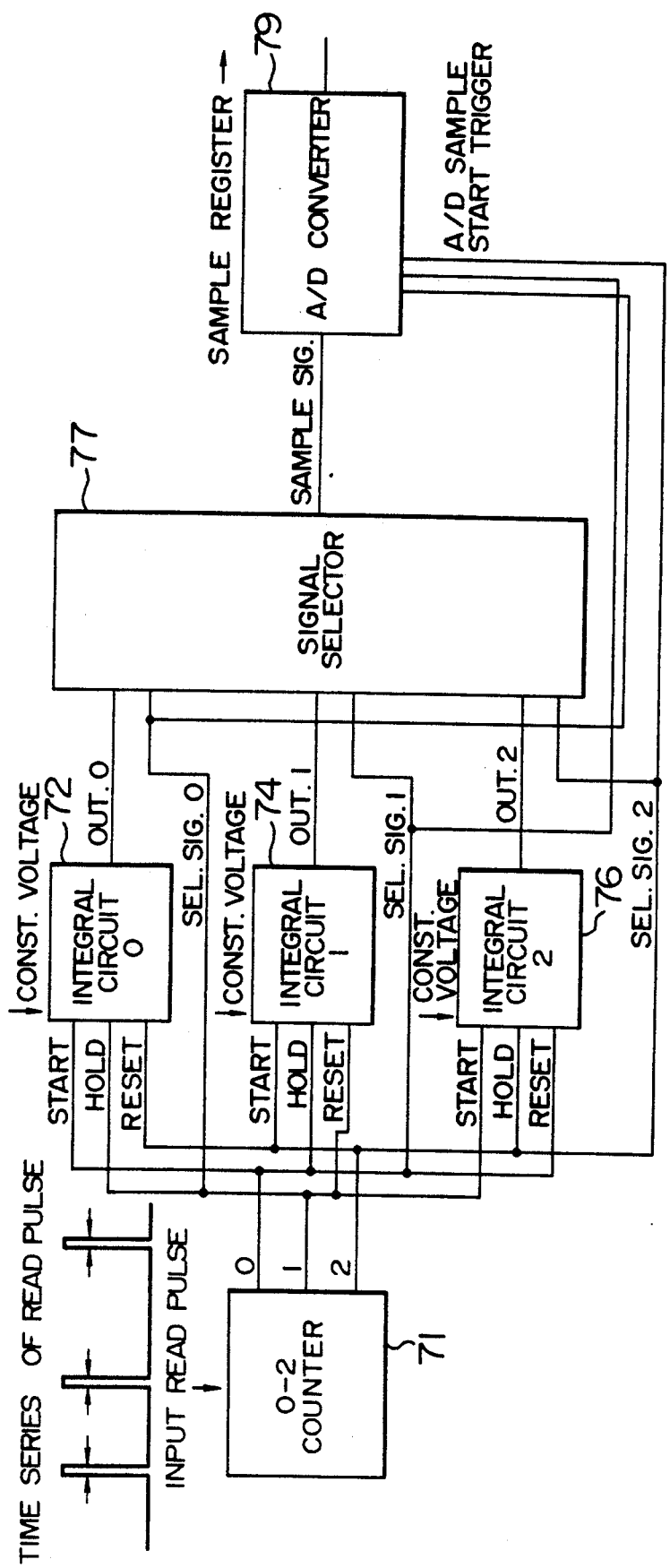

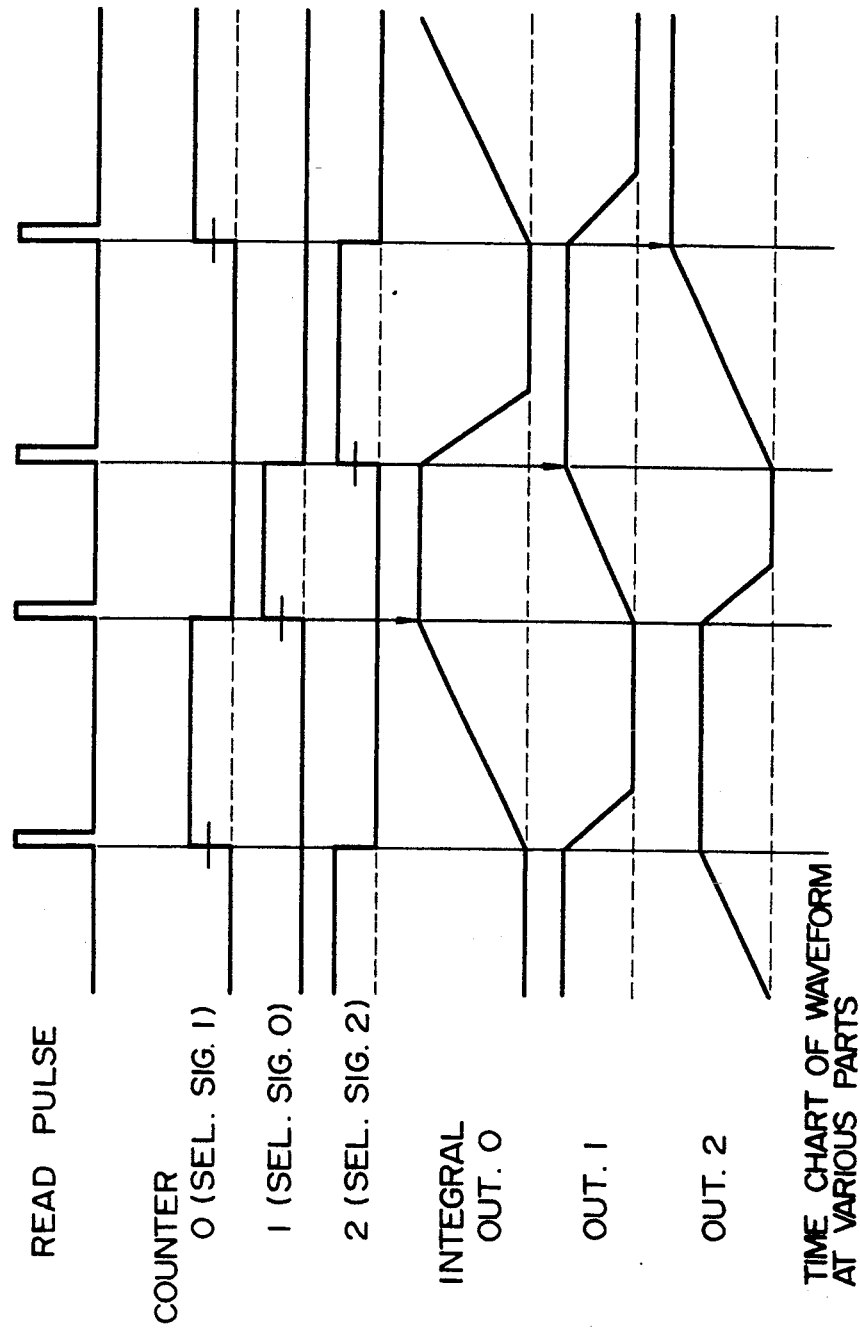

F I G. 16A
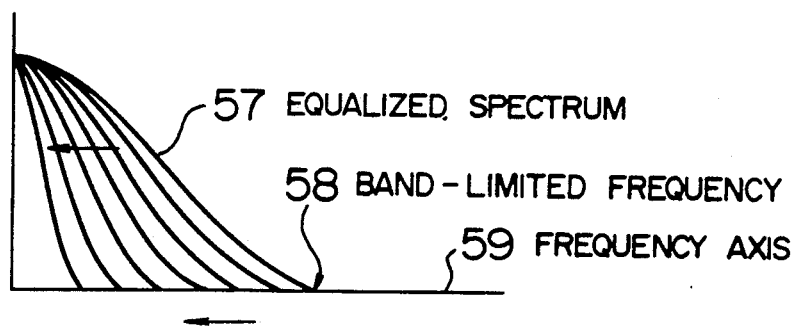
F I G. 16B
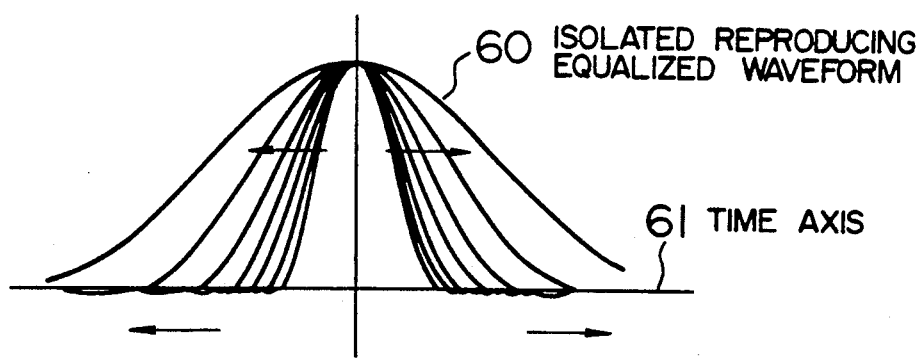

PEAK DETECTION METHOD AND APPARATUS THEREFOR

BACKGROUND OF THE INVENTION

The present invention relates to the peak detection and peak sense detection or phase discrimination of a reproducing signal in a system for reproducing a magnetic record on a medium such as a magnetic tape, a magnetic disk, or the like. In particular, it relates to a peak detection system for reducing intersymbol interference (ISI) in code signals to thereby improve the S/N of a reproducing signal.

Maximum-likelihood peak position detection techniques applied to peak detection to equivalently reduce noise have been discussed in: H. Burkhardt, "An Event-driven Maximum-likelihood Peak Position Detector for Run-length-limited Codes in Magnetic Recording", IEEE Transactions on Magnetics, Vol. MAG-17, No. 6, pp. 3337-3339 (1981), and in U.S. Pat. No. 4,644,564.

Digital magnetic recording and signal processing techniques have been discussed in F. Dolivo, "Signal Processing for High-Density Digital Magnetic Recording", IEEE, pp. 1-91-96 (1989).

When magnetic recording is applied to a medium 31 in FIG. 1A, recording bits 30 composed of "1" and "0" (see FIG. 1B) are recorded as the presence and absence of magnetic flux change on the medium 31. Any one of MFM or run-length-limited codes such as (1, 7) code and (2, 7) code systems may be used. This magnetic flux change is read out as a peak 33a of a reproducing signal 33 (see FIG. 1C) from a magnetic head 32. To decide the phase of the peak 33a, the reproducing signal 33b equalized by an equalization circuit 34 (see FIG. 1D) is differentiated by a differentiation circuit 35. The zero-cross points of the differentiated signal waveform 33c (see FIG. 1E) are converted into a peak pulse train 37 by a pulse forming circuit 36 to thereby detect the phase of the signal peak 33a. A peak detection circuit 38 compares the phase of the detected peak pulse 37 (see FIG. 1F) with a detection window signal 37a (see FIG. 1G) having pulses respectively representing the width of a recording bit and judges by the presence and absence of pulses in the windows whether a bit of the reproducing coded signal 39 (see FIG. 1H) is to be "1" or to be "0". Recently, the pulse width of the window signal 37a generated by an oscillator (OSC) 29 on the basis of the signal 37 has been shortened to 18-19 ns.

In the following, detection error which occurs in the aforementioned peak detection systems is described with reference to FIGS. 2A through 2D as a part of the present invention.

As shown in FIG. 2A, the amplitude of a signal is reduced by the presence of adjacent magnetic flux change 40, that is, intersymbol interference (ISI) and nonlinear distortion occurs. As a result, the phase of a waveform peak 42 shifts by a pattern peak shift value 47 from an ideal isolated reproducing signal waveform. When noise is superimposed on this signal, the peak 42 shifts further so that it may be out of a window width 43. In this case, a peak pulse 37 (see FIG. 1F) corresponding to the phase of the peak 42 also shifts toward an adjacent window width 44, so that detection error 46 in two bits of the target window width 43 and the adjacent window width 44 may be brought by bit inversion 45.

SUMMARY OF THE INVENTION

An object of the present invention is to reduce such a problem in peak detection in which the range of the peak detecting operation relation to the detection windows is limited by the pattern peak shift 47.

Another object of the present invention is to provide a peak detection system which can equivalently suppress the influence of noise to make it possible to perform reproduction with a low S/N signal.

A further object of the present invention is to provide a system which can exactly detect a difference between reproducing waveform patterns due to interference (ISI, nonlinear distortion, etc.) by utilizing amplitude/phase information of pulse waveforms to thereby improve S/N in the peak detection.

A further object of the present invention is to solve the problem in lowering of the peak detection margin due to peak shifting, by judgment based on comparison of the peak interval/level difference with a sample waveform predetermined without use of detection windows to thereby greatly suppress deterioration of detection performance caused by peak shifting.

A further object of the present invention is to reduce the number of combinations of waveform patterns by utilizing a sample waveform pattern in a range of waveform interference to thereby reduce the circuit scale and calculation amount/complexity necessary for the judgment without deterioration of detection performance.

To attain the foregoing objects, the present invention is directed to peak detection based on a maximum-likelihood decoding method utilizing amplitude/phase information.

The theory of peak detection in the present invention will be described with reference to FIGS. 3A through 3D. As described above, in peak detection, the phase of a peak in a pulse waveform 1 of a reproducing signal read from a recording medium is detected and decoded to bit "1" (the phase of a non-peak is decoded to bit "0"). In the present invention utilizing the theory of maximum-likelihood decoding, when the reproducing signal waveform 1 as shown in FIG. 3A is read out, waveform peaks $1a$–$1h$ of the reproducing signal waveform 1 are detected by a predetermined signal processing means. The object of peak detection is to obtain a decoded result by setting bit "1" to the timing of these peaks through detecting the peak timing and by setting bit "0" to the interval between these peaks through judging the number of bits corresponding to the peak interval. When two sequential waveform peaks, for example, $1a$ and $1b$, appear in the present invention, the peak amplitude level difference $2a$ therebetween is detected or the bit length of a reproducing bit train corresponding to the peak time interval $2b$ is judged by the peak amplitude level difference $2a$. Instead of the peak amplitude level difference, the peak time interval $2b$ may be directly detected to judge the bit length. Alternatively, the bit length may be judged by both the level difference $2a$ and the time interval $2b$. After a sequential peak data train 2 is arranged by detecting the peak amplitude level difference $2a$ and the peak time interval $2b$, an optimum decoded result can be selected from the whole of the peak data train 2 on the basis of the theory of maximum-likelihood decoding. Therefore, all combinations of sample waveform bit trains $3f$ allowed to appear in a range of the bit length of the detected peak data train 2 are now considered to assume waveforms corresponding to the combinations of bits as sample waveforms 3 in an ideal state free from noise. The respective sample waveform 3 can contain less noise when it may be formed by averaging a plurality of reproduced waveforms. The respective sample waveform 3 contains, as information, the waveform peak position change dependent on the reproducing waveform pattern such as waveform interference (intersymbol interference) on the reproducing site. Accordingly, sample peak data trains 3a determined on the basis of the peak positions of the sample waveforms 3 can be prepared in advance correspondingly to the all patterns, so that the nearest one to the peak data train 2 can be selected from the sample peak data trains 3a on the basis of comparison between the peak data train 2 of the actual reproducing signal waveform 1 and the sample peak data trains 3a. In short, the bit train 3f of the sample waveform 3 can be decided as a decoded result.

Here, the peak time intervals 2b and 3e and the peak amplitude level differences 2a and 3d prepared for the peak data train 2 and the sample peak data train 3a are respectively obtained by taking relative time difference/level difference between adjacent peaks 1a and 1b or between adjacent peaks 3b and 3c. Whenever a peak is detected from the reproducing signal, the time difference or amplitude level difference between the current peak and the preceding peak is detected and successively compared with those on the sample peak data trains 3a to select a sample peak data being smallest in comparison error as a whole.

The S/N of the reproducing signal can be equivalently improved by applying the theory of maximum-likelihood decoding to peak detection. That is, when the relative time interval/relative amplitude level difference between adjacent peaks of the reproducing waveform is used as a detection standard, the deviation of noise superposed on the time interval/level difference as a reference value for estimation becomes smaller than the deviation of noise superposed on the actual signal, so that the S/N is improved equivalently. Because an optimum decoded result for all reproducing signal sequences can be given by repeating such estimation for the whole reproducing signal, decoding error rate in the reproducing system under a given condition can be minimized to realize maximum-likelihood decoding.

In the present invention, estimation is made by comparison between the actual reproducing waveform data and a sample peak data train instead of using the conventional detection window. Accordingly, the influence of pattern peak shifting can be eliminated on the reproducing site to prevent deterioration of detection performance, by giving waveform interference (intersymbol interference) information to the sample peak data train in advance.

FIG. 4 is a characteristic graph of the S/N of the reproducing signal as the abscissa versus the bit error rate of the peak detection system as the ordinate, showing the comparison between the conventional peak detection system and the peak detection system according to the present invention. Compared with the conventional peak detection system, the peak detection system according to the present invention exhibits the S/N improvement of about 3.3 dB for the bit error rate of $10^{-9}$.

BRIEF DESCRIPTION OF THE DRAWINGS

FIG. 1A is a block diagram of a peak prior art detector;

FIGS. 1B through 1H are graphs of signal prior art waveforms at respective positions shown in FIG. 1A;

FIGS. 2A through 2D are views for explaining the error condition and the problem in peak detection;

FIGS. 3A through 3D are views for explaining peak detection according to the present invention;

FIGS. 10 through 12 are diagrams of peak detection showing the present invention;

FIG. 13 is a time chart showing peak time interval detection for converting time into level;

FIGS. 14 and 15 are explanatory views showing the operation of the detection section in the apparatus according to the present invention;

FIG. 16A is a graph of the frequency axis as the abscissa showing the operation of the apparatus according to the present invention; and FIG. 16B is a graph of the time axis as the abscissa showing the operation of the apparatus according to the present invention.

DESCRIPTION OF THE PREFERRED EMBODIMENTS

Figure 4:
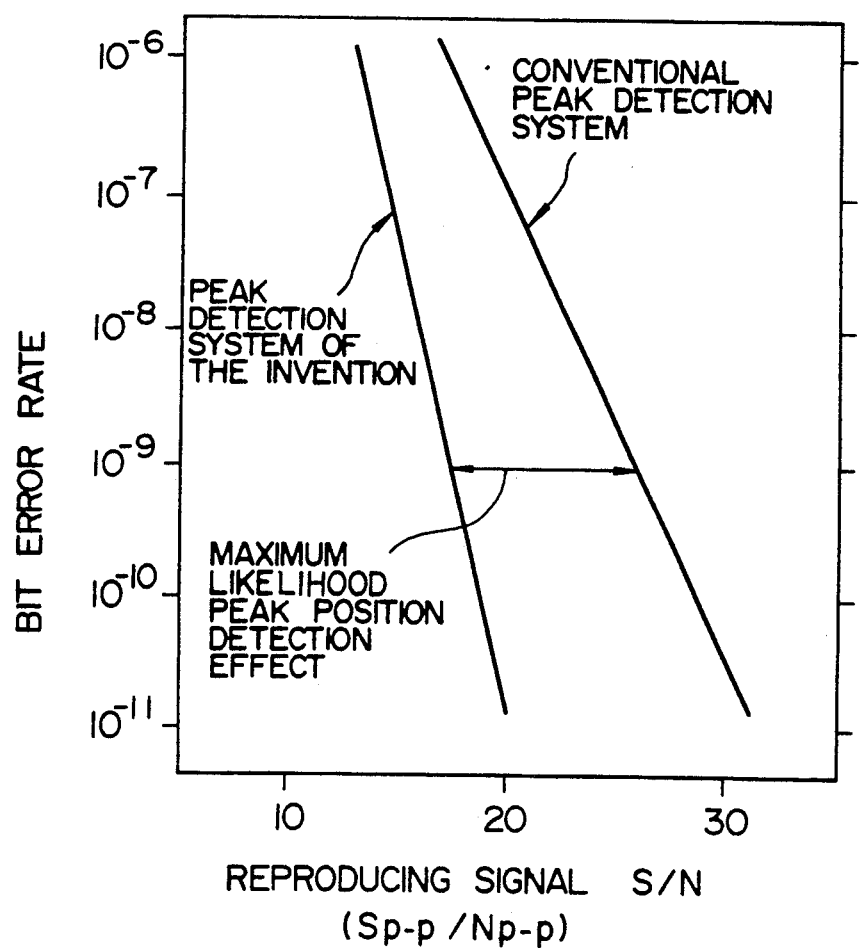
FIG. 4 is a graph showing the improvement of S/N performance in peak detection according to the present invention.
Figure 5:
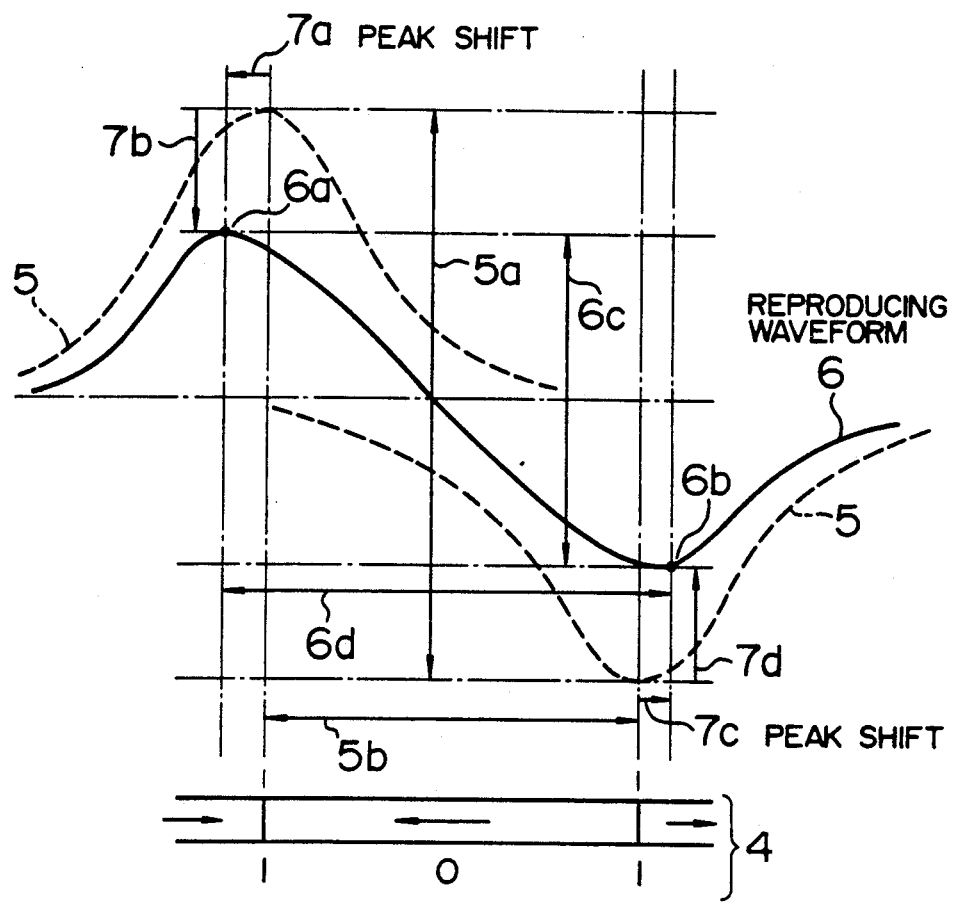
FIGS. 5 and 6 are diagrams in which feature values of a sample waveform necessary for the present invention are decided.

FIG. 5 shows a theory on preparation of sample peak data trains, necessary for realization of peak detection according to the present invention on the basis of the theory as shown in FIGS. 3A through 3D. FIG. 5 shows an embodiment in which sample peak data are decided for the purpose of eliminating the influence of pattern peak shifting on the reproducing site.

As shown in FIG. 5, a reproducing waveform 6 read from adjacent magnetic inversions 4 on a medium surface has such a shape in which waveform interference occurs between opposite polarities compared with ideal isolated reproducing waveforms 5 of 2-bit inversion. By this interference, the amplitudes of the two ideal isolated reproducing waveforms 5 are reduced as level lowerings 7b, 7d, and the waveform peaks of the two ideal isolated reproducing waveforms 5 shift from each other as peak shiftings 7a, 7c to the actual reproducing waveform peaks 6a, 6b. On comparison in such a model, the peak time interval 6d produced by this adjacent magnetic flux change 4 can be regarded as a value obtained by adding the two peak shiftings 7a and 7c to the time interval 5b of magnetic flux change. The peak amplitude level difference 6c can be regarded as a value obtained by subtracting the level lowerings 7b and 7d from double the deal amplitude level difference 5a of the respective ideal isolated reproducing waveforms 5.

Figure 6:
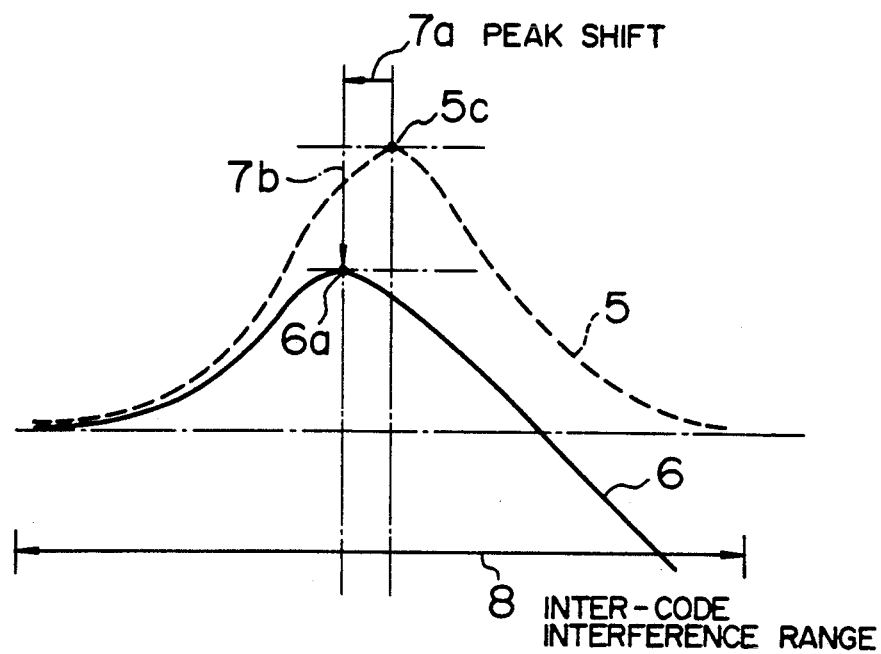

Accordingly, a sample peak data train exactly containing waveform interference (intersymbol interference) information can be expressed when the peak shifting 7a and level lowering 7b of a center peak 5c are measured by superposing noiseless isolated reproducing waveforms 5 on all waveform patterns that could appear in a range 8 of interference between adjacent bits with respect to the center peak 5c as shown in FIG. 6.

Figure 7A:
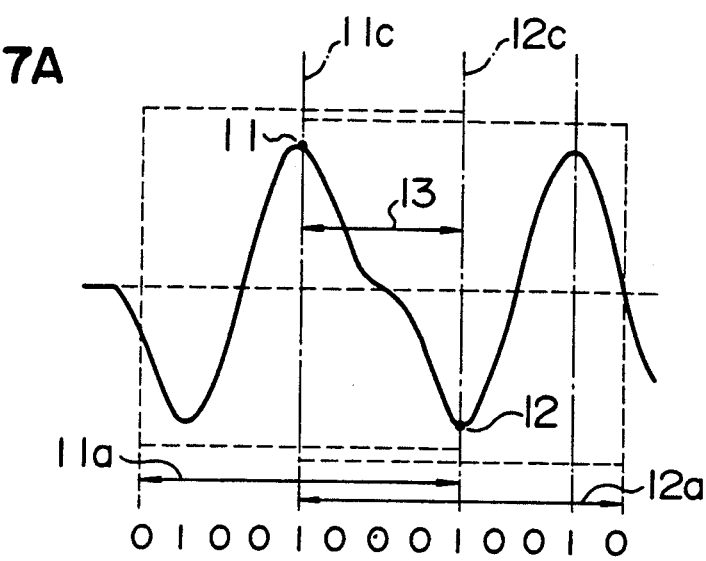
FIGS. 7A through 7C are views showing state transition for expressing waveform peaks by using these sample waveforms.
Figure 7B:
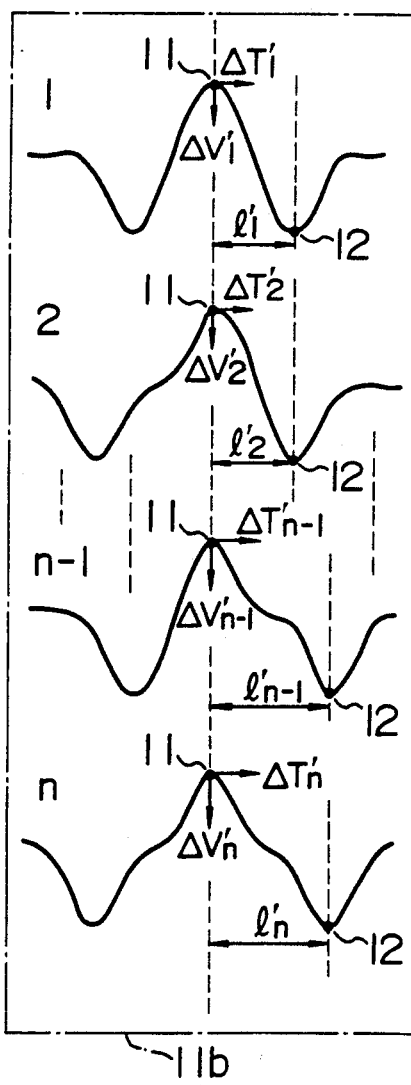
Figure 7C:
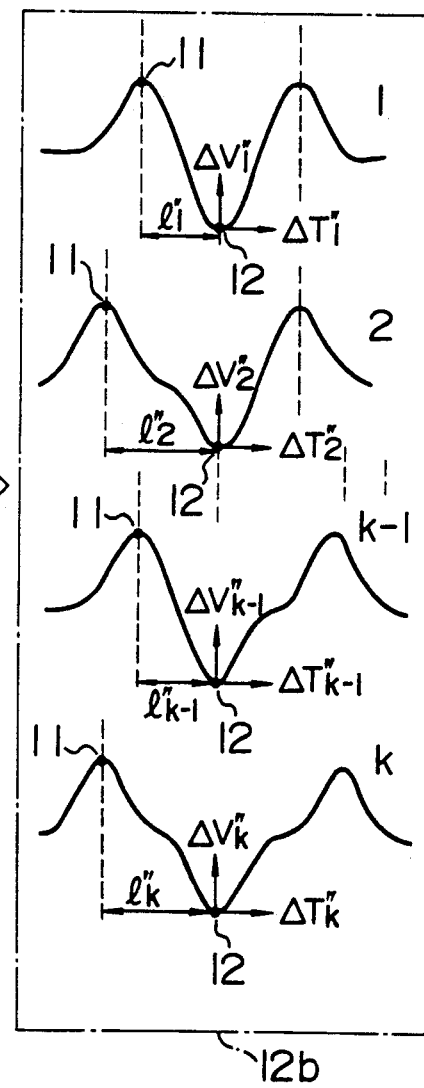

The actual peak interval is expressed by repetition of the pattern of FIG. 6. An example of an expression of the peak interval is shown in FIG. 7A. As shown in FIG. 7A, one peak interval 13 is determined by the shiftings of adjacent peaks 11 and 12, so that the actual pattern can be expressed by the state transition from a pattern 11b to a pattern 12b on the assumption that the waveform patterns 11b (FIG. 7B, 1 to n) and 12b (FIG. 7C, 1 to k) are respectively the possible patterns that might appear in the adjacent interference ranges 11a and 12a of the peaks 11 and 12. That is, as shown in FIGS. 7B and 7C, a common portion to the two patterns before and after the transition corresponds to the peak interval 13 to be expressed, so that state transition exists when the patterns coincide with each other in this portion. Here, the peak time interval 13 expressed by transition from one n of patterns 11b to one k of patterns 12b can be calculated by adding the peak shifting change $\Delta T_n'$ the pattern n and the peak shifting change $\Delta T_k''$ of the pattern k to a normal bit interval $1'_n$ (or $1''_k$). The level difference between the two peaks 11 and 12 can be calculated by subtracting the level lowerings $\Delta V'_n$ and $\Delta V''_k$ respectively determined by the patterns n and k from the normal or ideal amplitude. By the aforementioned technique, the peak time interval and peak amplitude level difference on consideration of waveform interference can be prepared for all peak intervals expressed by state transition from one of patterns 11b to one of patterns 12b.

To prepare a sample peak data train in this embodiment, the peak shiftings or levellowerings from ideal waveform patterns are calculated on consideration of combinations of bits in a waveform interference range limited to the neighbor of the peak.

When the actual magnetic recording/reproducing system (using an equalization circuit, see FIG. 1A) has an interference range of about 4 bits, peak shiftings or level lowerings must be calculated for 64 patterns in the case of (1, 7) coding. Compared with the case of no consideration of such an interference range, the circuit scale and processing capacity for estimation can be reduced about 1/20.

Figure 8A:
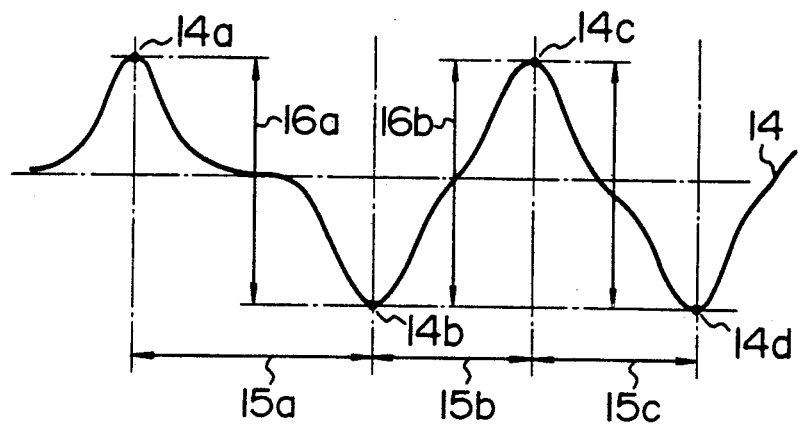
FIGS. 8A and 8B are views of waveforms showing state transition.
Figure 8B:
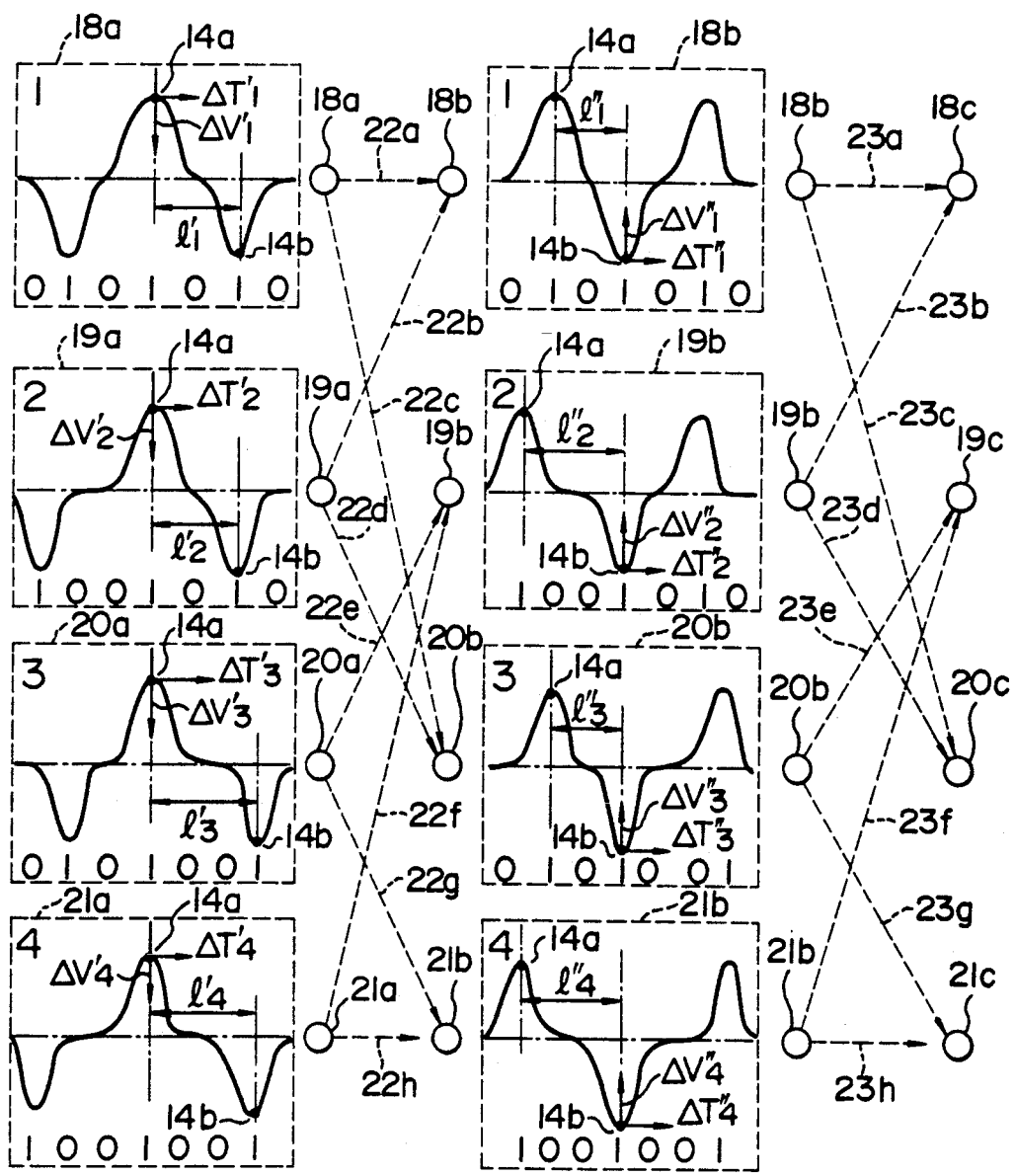
Figure 9:
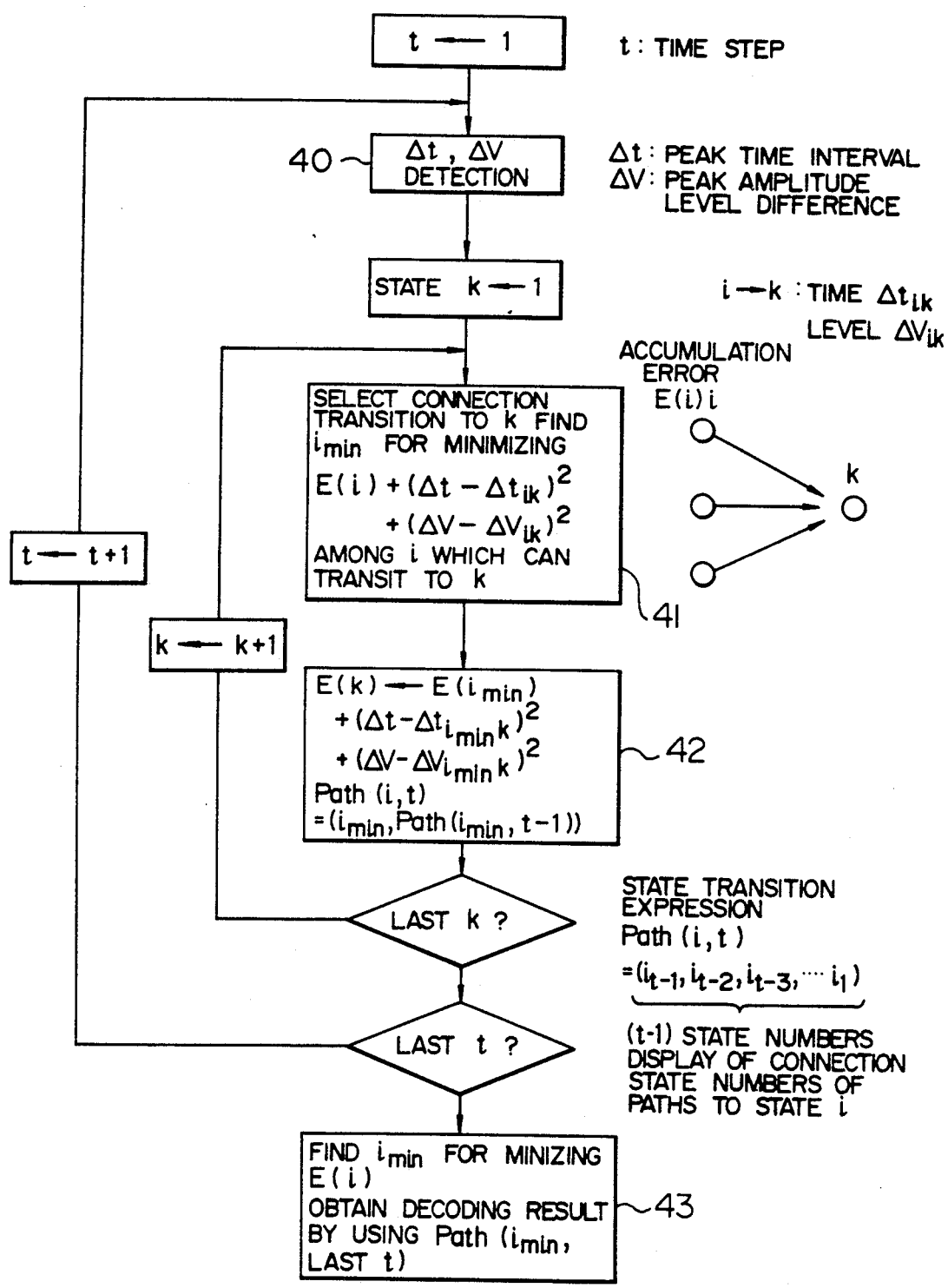
FIG. 9 is a flow chart of data processing using the state transition.

An embodiment of peak detection in the present invention is shown in FIGS. 8A and 8B. A flow chart of the data processing for the peak detection is shown in FIG. 9. Here, discrimination of the interval of two bits as represented by the binary pattern 101 and discrimination of the interval of three bits as represented by the binary pattern 1001 will be described for simplification. It is to be understood that the same technique can be applied to the case where the number of "zeros" between two "ones" are larger. When interference is in a range of three bits, it is obvious from the aforementioned embodiment that pattern peak shiftings/level lowerings to be prepared in advance must be considered for 4 patterns 18a to 21a (or 18b to 21b). The peak 14a of pattern 18a corresponds to the peak 14a of pattern 18b. If the allowed connections of binary patterns given to the lower side of the respective broken-line block, that is, state transitions, are considered, eight transitions 22a to 22h as shown by the broken lines can be considered so that the time interval and amplitude level difference are provided for the peak interval expressed by the respective transition. On the other hand, when the peak interval 15a and the level difference 16a are detected from the reproducing waveform 14 in FIG. 8A, an optimum state transition expressing the nearest peak is selected or discriminated from the eight state transitions 22a to 22h by calculating the square of the deviation of the time interval/amplitude level. Because one of states 18b to 21b after transition cannot be selected or discriminated if the future state from the peak 14b is unknown, each transition for four states must be selected on the assumption that the probability of one state being chosen is equal to the probability of another state. For example, the state transitions to 18b are two, 22a and 22b, and, accordingly, any one of the two is selected by the aforementioned technique.

Also at the point of time the next interval 15b or the next level difference 16b is detected, a state transition is selected from the next eight transitions 23a to 23h by repeating the same procedure as described above. The theory of the present invention as shown in FIGS. 3A through 3D can be realized by repeating the procedure successively, so that decoding can be achieved by tracing the finally remaining state transition.

In the following, the peak detection method according to the present invention is applied to a magnetic recording/reproducing system in practical use with reference to FIGS. 10, and 12 through 16A,B. The reproducing system equalizes a signal read from a magnetic head 52 in an equalization (wave-shaping) circuit 53, differentiates it in a differentiation pulse circuit 54 to convert it to a pulse signal representing waveform peak positions and reproduces it to data code 56 in a peak detection circuit 55. As the present invention is applied to the peak detection circuit 55, the advantage thereof is in that reduction in allowed noise level during the detection caused by signal level lowerings, peak shiftings, etc. due to waveform interference (intersymbol interference) is suppressed by giving interference information of reproducing waveforms to a template waveform (18a–21a, 18b–21b; in FIG. 8B). Accordingly, the peak shiftings due to waveform interference (intersymbol interference) can be compensated for considerably by applying this method to the peak detection circuit 55, as compared with the conventional method.

A diagram of a hardware apparatus for realizing the present invention is shown in FIG. 11. As a basic construction, the use of waveform peak time intervals (15a, 15b and 15c in FIG. 8A) for performing reproducing is now considered. The hardware construction is mainly classified into a detection section 95, a calculation section 97 and a discrimination section 99. The detection section detects the time intervals (15a, 15b and 15c in FIG. 8A) of a read pulse (peak pulse) train extracted from peaks of reproducing waveforms and converts the time intervals into digital values of pulse time interval (step 40 in FIG. 9). The calculation section calculates the accumulated square error on the basis of the detected time intervals and the ideal time intervals in the noiseless state of sample pattern or template waveforms (18a, 19a, 20a, 21a, 18b, 19b, 20b and 21b in FIG. 8B) to select the smallest error (metric) (step 41 in FIG. 9). At this time, the discrimination section records the selected accumulated square error sequences in a storage (step 41 in FIG. 9) and performs decoding on the basis of the time step t of the smallest error sequence among the sequences stored in the storage (step 43 in FIG. 9).

Figure 12:
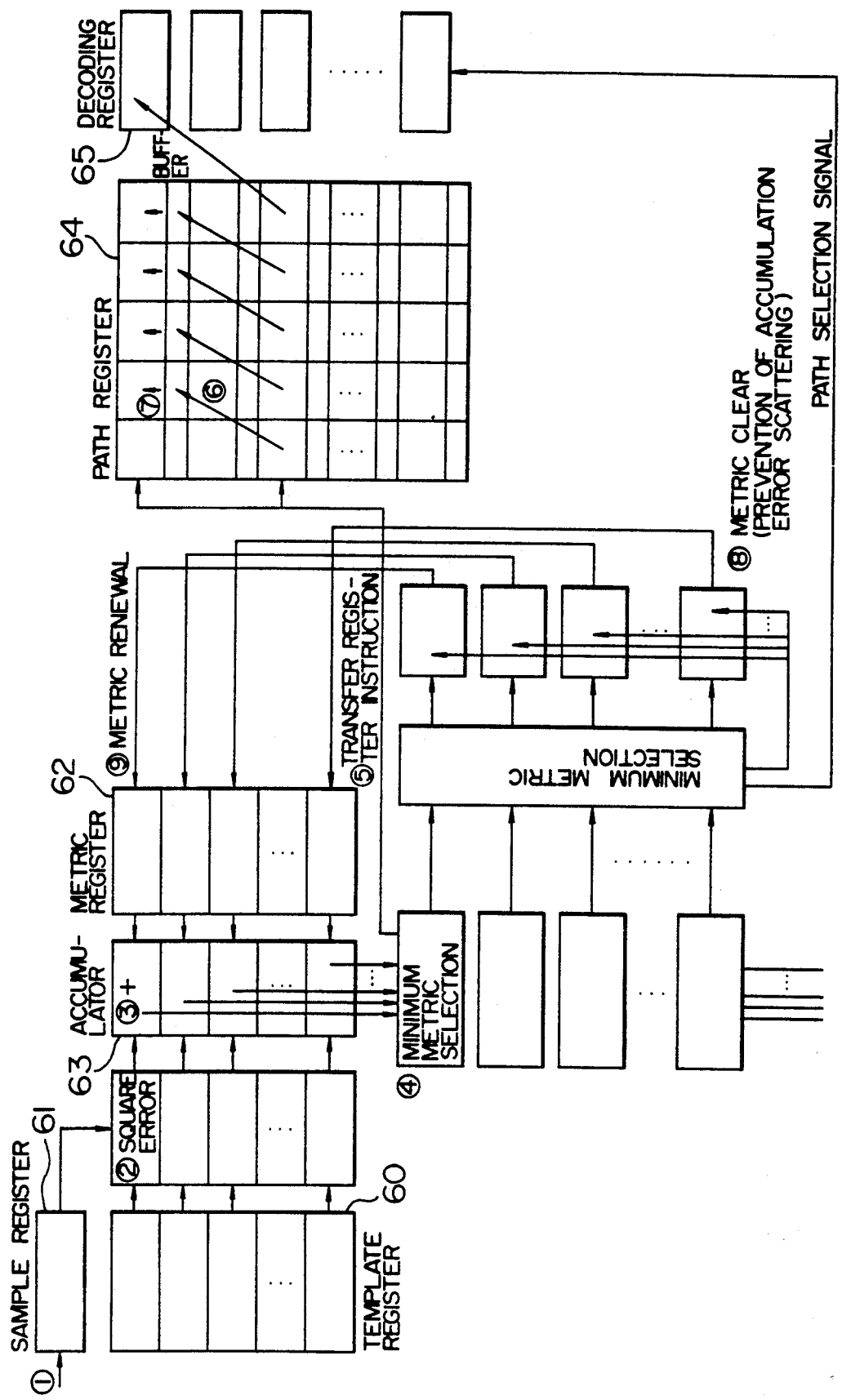

The calculation section 97, as shown in FIG. 12, calculates the square error between a sample register 61 and respective template registers 60 on the basis of the contents of the sample register which registers the detected time intervals (15a, 15b and 15c in FIG. 8A) and the contents of the template registers 60 which register noiseless ideal peak time intervals corresponding to respective state transitions (22a–22h in FIG. 8B). FIG. 12 shows an example of construction suitable for high-speed parallel processing for the repetition loop in the step 41 in FIG. 9. The accumulated square errors in the respective state transition sequences are stored in the metric register 62. The sum of the calculated square errors and the accumulated square errors E(i) in the past sequences to the respective state transitions is calculated in an accumulator 63 to produce new accumulated errors. Among the accumulated square errors thus calculated, the minimum one is selected from the accumulated errors in sequences to one state (step 41 in FIG. 9) and is recorded in a path register 64 (step 42, Path (i, t) in FIG. 9). The selected value of accumulated error is also used as a new value in the metric register 62 (step 42, E(k) in FIG. 9). At this time, the smallest one is selected from the selected accumulated errors (the accumulation square errors of sequences connected to respective states) to prevent the accumulated error from gradually increasing and finally diverging. The respective accumulated errors are expressed as relative values by reference to the minimum one and set to the metric register 62.

The respective numbers of the state transition sequences connected to respective states are registered in the path register 64, so that sequences to the state k are reproduced by tracing the contents of the k-th line of the path register 64. When, for example, transitions from the state m to the state n are selected as sequences to the state n, the contents of the m-th line of the path register 64 are shifted by one bit to be transferred to the n-th line. At this time, the contents overflowing out of the path register are registered in a decoding register 65. Because a plurality of data transfers occur in the path register simultaneously, the contents to be transferred are classified into the read timing and the write timing to perform such data transfers through a buffer register. If the length of the path register 64 is sufficiently large, the numbers of the state sequences written in the decoding register 65 become equal. If the register length is limited, one decoding register must be selected from the decoding registers. Therefore, the numbers of states (decoding register) written from the sequence of highest probability by using the result of selection of the minimum accumulated error are selected to judge the number of bits in the peak interval. On the hardware construction, the result of discrimination is delayed for the length (peak interval) of the path register after the detection of the pulse interval.

In the detection section 95 shown in the hardware main construction view of FIG. 11, the peak time intervals of the analogue reproducing waveforms are detected and converted into digital values suitable for calculation, step 40. In the available magnetic recording system, the analogue reproducing waveforms are converted into a read-pulse signal having pulses generated in the peak timing, by using a differentiation circuit or the like. The section detecting the time intervals of pulses successively generated on the read-pulse signal, digitizing them and transferring them to the sample register 61 in FIG. 12 is the detection section 95.

An example of construction of the detection section is shown in FIGS. 13 through 15.

FIG. 13 is a time chart showing the theory of detection of a read-pulse time interval. In this example, the time interval $\Delta t$ between pulses P.(0) and P.(1) is detected. Therefore, a constant voltage is analog-integrated for the time $\Delta t$ with P.(0) as a start trigger and P.(1) as a stop trigger. As a result, a voltage ($\Delta t$-level conversion value) proportional to the time interval $\Delta t$ is obtained as an integrated value. The integrated voltage is held before the next read-pulse P.(2) is generated. While the integrated voltage is held (during the A/D converting idle time), this voltage is converted into a digital value to be delivered to the sample register in the hardware construction diagram. The held integrated voltage value is discharged rapidly to an original level by the action of the read pulse P.(2) (discharge reset time).

To apply this theory to the detection of the time intervals of continuously generated read pulses to realize the high-speed detection of the read pulse intervals which are relatively short time intervals, the theory in FIG. 13 is multiplexed by using three or more integral circuits. An example of multiplex integration using three integral circuits is shown in FIG. 14. Each of the integral circuits (0–2) has an input (start) for utilizing the leading edge of an input signal as a start trigger, and an input (hold) for utilizing the leading edge of an input signal as a stop (integrated value hold) trigger. A constant voltage is integrated for the time from the rising of the start input signal to the rising of the hold input signal and outputted to out.0–out.2. When the leading edge of a reset input signal is detected, the integrated value is discharge rapidly with the reset input signal as a trigger. Accordingly, each of the integral circuits (0–2) repeats a series of operations, that is, a constant voltage integrating operation, an integration terminating and integrated value holding operation and a discharging operation, by successively detecting the leading edges of the start input, hold input and reset input signals to realize the theory in FIG. 13. By providing such three integral circuits in parallel as shown in FIG. 14, one integral circuit can detect read-pulse time intervals while a second integral circuit holds the voltage (performs A/D conversion) of a previous time interval and the third integral circuit discharges the voltage held from a still previous time interval. Therefore, a ternary one-digit counter (0–2 counter) 71 may be provided so that the generation of a read pulse is evaluated to count the number of read pulses when the read pulse signal exceeds a slice level. Assuming now that the output (0, 1, 2) of the counter shows (low, low, high) level at an initial stage, then the output (0, 1, 2) is successively switched to (high, low, low)→(low, high, low)→(low, low, high)→(high, low, low) whenever a read pulse is generated. In short, the counter forms a three-state transition repeating sequence circuit in which any one of the three output signals is always high. The three output signals are linked to the three input signals (start, hold and reset) of the integral circuits (0–2) 72, 74 and 76 as shown in FIG. 14. By connecting the start input of the integral circuit 0, the hold input of the integral circuit 1 and the reset input of the integral circuit 2 to the output 0 of the counter, the integral circuits 0–2 can be triggered by the rising of the output signal 0 to the integrating state, the holding state and the discharging state, respectively and simultaneously. By connecting the hold input of the integral circuit 0, the reset input of the integral circuit 1 and the start input of the integral circuit 2 to the output 1 of the counter, the integral circuits 2, 0 and 1 can be triggered by the rising of the output signal 1 to the integrating state, the holding state and the discharging state, respectively and simultaneously. By connecting the reset input of the integral circuit 0, the start input of the integral circuit 1 and the hold input of the integral circuit 2 to the output 2 of the counter, the integral circuits 2, 1 and 0 can be triggered by the rising of the output signal 0 to the integrating state, the holding state and the discharging state, respectively and simultaneously. Accordingly, a voltage value corresponding to the time interval between a read pulse triggering the counter output and the next read pulse can be obtained as out. 0-2 of the integral circuits (0-2) because the counter outputs, 0, 1 and 2 are repeatedly triggered in order by the successively detected read pulses.

Further, a signal selector 77 may be provided to select the output of the integral circuit which is in the holding state. The output 1 of the 0-2 counter is used as a signal (sel.sig.0) for selecting the integral circuit 0. By this technique, the output 0 can be selected to be given to the sample.sig. at the same time the integral circuit 0 is switched from the integrating operation to the holding operation on the basis of the rising of the output 1. Therefore, A/D conversion is made by the A/D converter 79 in the next stage. Because the selection signal (sel.sig.0) is used also as a sample trigger to the A/D converter, the selected integral circuit output out.0 is soon converted into a digital value to be transferred to the sample register of the decoder. Similarly to this, by connecting the counter output 0 as a signal sel.sig.1 for selecting the output out.1 of the integral circuit 1 and the counter output 2 as a signal sel.sig.2 for selecting the output out.2 of the integral circuit 2 and by using the selection signals sel.sig.1 and sel.sig.2 respectively as sample triggers for the A/D converter, the outputs out.1 and out.2 of the integral circuits 1 and 2 which are in the holding state can be selected to be subjected to A/D conversion. FIG. 15 is a time chart showing waveforms at the respective positions.

It will be possible to further improve the S/N by narrowing the frequency band in actual peak-detection for reproduction.

The isolated reproducing equalized waveform 60 on the time axis 61 is widened as shown in FIG. 16B to increase the peak shifting, by narrowing the band-limited frequency 58 of the equalized spectrum 57 in the waveform processing (equalization) as shown in FIG. 16A. As described above, reduction in allowed noise range caused by the increase of the peak shifting can be suppressed by application of this method according to the present invention. Accordingly, the quantity of high-frequency noise can be relatively reduced by narrowing the band-limited frequency, so that detection performance can be improved with the substantial improvement of the S/N.

While a preferred embodiment has been set forth while specific details, further embodiments, modifications and variation are contemplated according to the broader aspects of the present invention, all as determined by the spirit and scope of the following claims.

What is claimed is:

1. A method for peak detection of a magnetic reproducing signal, comprising:
   a first detection step of detecting the time interval/amplitude level differences between sequential peaks in waveform of first reproducing signals from a recording medium;
   a step of storing the detected time interval/amplitude level differences in a storage corresponding respectively to a plurality of different bit patterns in the signals;
   a second detection step detecting the time interval/amplitude level difference between peaks in a waveform of a second reproducing signal from the recording medium; and
   a step of comparing the detected time interval/amplitude level difference of the second reproducing signal with the time interval/amplitude level differences stored in the storage to thereby perform peak detection in the waveform of the second reproducing signal continuously on a real time basis.

2. A method for peak detection of a magnetic reproducing signal, comprising:
   a first detection step of detecting the time interval/amplitude level difference between sequential peaks in waveforms of first reproducing signals from a recording medium;
   a step of storing the detected time interval/amplitude level difference in a storage;
   a second detection step detecting the time interval/amplitude level difference between peaks in a waveform of a second reproducing signal from the recording medium;
   a step of selecting a maximum-likelihood waveform from the waveforms of the first reproducing signals on the basis of the peak detection between the respective waveforms of the first reproducing signals and the waveform of the second reproducing signal;
   a step of providing an original bit train of the first reproducing signal corresponding to the waveform read form a magnetic head; and
   comparing the detected peak time interval/peak amplitude level difference with the peak time interval/peak amplitude level difference of an ideal reproducing signal waveform prepared in advance by averaging a plurality of reproducing signal waveforms to thereby perform peak detection of the reproducing signal waveform.

3. A method according to claim 1, wherein data are provided to represent the time interval/amplitude level difference between the sequential peaks in the waveforms of the first reproducing signals in a range of electromagnetic signal interference on the recording medium.

4. An apparatus for peak detection of a magnetic reproducing signal, comprising:
   a detection section for detecting the time interval/amplitude level differences between sequential peaks in waveforms of first reproducing signals from a recording medium corresponding to a plurality of different bit patterns in the signals, said detection section having a storage for storing the detected time interval/amplitude level differences, said detection section continuously detecting the time interval/amplitude level difference between peaks in a waveform of a second reproducing signal from the recording medium; and
   a comparison section connected to said detection section for comparing each time interval/amplitude level difference of the second reproducing signal detected by said detection section with the time interval/amplitude level differences stored in said storage to thereby perform peak detection in the waveform of the second reproducing signal using the first reproducing signals as references.

5. An apparatus for peak detection of a magnetic reproducing signal, comprising:
a detection section for detecting the time interval/amplitude level differences between sequential peaks in waveforms of first reproducing signals from a recording medium, said detection section having a storage for storing the detected time interval/amplitude level difference, said detection section detecting the time interval/amplitude level difference between peaks in a waveform of a second reproducing signal from the recording medium; and
a comparison section connected to said detection section for comparing the time interval/amplitude level difference detected by said detection section with the time interval/amplitude level difference stored in said storage to thereby perform peak detection in the waveform of the second reproducing signal;
wherein said comparison section includes:
a selection means for selecting a maximum-likelihood waveform from the waveforms of the first reproducing signal on the basis of the peak detection between the respective waveforms of the first reproducing signals and the waveform of the second reproducing signal; and
means connected to said selection means for providing an original bit train on the first reproducing signals corresponding to the selected maximum-likelihood waveform.

6. An apparatus according to claim 4, wherein data are provided to represent the time interval/amplitude level difference between the sequential peaks in the waveforms of the reproducing signals in a range of electromagnetic signal interference on the recording medium.

7. An apparatus for peak detection of a magnetic reproducing signal, comprising:
a detection section for detecting the time intervals between sequential peaks in waveforms of first reproducing signals from a recording medium corresponding to a plurality of different bit patterns in the signals, said detection section having a storage for storing the detected time intervals, said detection section continuously detecting the time interval between peaks in a waveform of a second reproducing signal from the recording medium; and
a comparison section connected to said detection section for comparing each time interval of the second reproducing signal detected by said detection section with the time intervals stored in said storage to thereby perform peak detection in the waveform of the second reproducing signal using the first reproducing signals as references.

8. An apparatus for peak detection of a magnetic reproducing signal, comprising:
a detection section for detecting the time interval between sequential peaks in waveforms of first reproducing signal from a recording medium, said detection section having a storage for storing the detected time interval, said detection section detecting the time interval between peaks in a waveform of a second reproducing signal from the recording medium;
a comparison section connected to said detection section for comparing the time interval detected by said detection section with the time interval stored in said storage to thereby perform peak detection in the waveform of the second reproducing signal;
wherein said comparison section includes:
a selection means for selecting a maximum-likelihood waveform from the waveforms of the first reproducing signals on the basis of the peak detection between the respective waveforms of the first reproducing signals and the waveform of the second reproducing signal; and
means connected to said selection means for providing an original bit train of the first reproducing signals corresponding to the selected maximum-likelihood waveform.

9. A method for peak detection in a magnetic recording/reproducing system, comprising the steps of:
(a) detecting the peak time interval of a reproducing signal waveform read from a magnetic head; and
(b) comparing the detected peak time interval with the peak time interval of an ideal reproducing signal waveform prepared in advance by averaging a plurality of reproducing signal waveforms to thereby perform peak detection of the reproducing signal waveform.

10. A method for peak detection in a magnetic recording/reproducing system, comprising the steps of:
detecting the peak time interval/peak amplitude level difference of a reproducing signal waveform read from a magnetic head; and
comparing the detected peak time interval/peak amplitude level difference with the peak time interval/peak amplitude level difference of an ideal reproducing signal waveform prepared in advance by averaging a plurality of reproducing signal waveforms to thereby perform peak detection of the reproducing signal waveform.

11. A method according to claim 9, wherein an optimum decoding result for the whole reproducing signal is decided by sequentially applying said peak detection to a plurality of waveform peaks appearing in the reproducing signal.

12. A method according to claim 9, wherein a pattern of said ideal reproducing signal waveform is prepared in a range of inter-code electromagnetic interference in the magnetic recording/reproducing system to thereby perform peak detection on the basis of the peak time interval including a pattern peak shift value.

13. A method according to claim 10, wherein a pattern of said ideal reproducing signal waveform is prepared in a range of inter-code interference to thereby perform peak detection on the basis of the peak amplitude level difference including an amplitude level lowering value caused by waveform interference.

14. A method according to claim 13, wherein the frequency band of the reproducing signal waveform is limited or narrowed before the peak detection of the reproducing signal waveform.

15. A peak detection method for recognizing data, comprising:
detecting peaks of a reproducing signal waveform having peaks corresponding to a magnetic flux change in a read magnetic medium used in producing the reproducing signal waveform;
comparing the peak characteristic of each peak of the reproducing signal waveform to stored data corresponding to peak characteristics of a plurality of sample reproducing signal waveforms of differing codes within a range of significant intersymbol interference and nonlinear distortion caused by the differing codes; and
based upon said comparing, assigning a reproducing code.

16. A peak detection method according to claim 15, wherein said comparing compares the reproducing signal waveform to a plurality of different sample waveform patterns in a range of waveform interference and determines corresponding peak characteristic errors.

17. A peak detection method according to claim 16, wherein said method does not employ detection windows.

18. A peak detection method according to claim 16, wherein said detecting equalizes the reproducing signal waveform to produce an equalized waveform, thereafter differentiates the equalized waveform, and detects zero crossings as waveform peak timings; and
said step of comparing compare the waveform peak timings to peak timings of different codes.

19. A peak detection method according to claim 18, wherein said comparing determines pattern peak shift between the reproducing signal waveform and an ideal isolated reproducing signal waveform and compares the amount of peak shift with peak shifts produced by different sample reproducing patterns within the range of significant intersymbol interference and determines the most likely reproducing code.

20. A peak detection method according to claim 16, wherein said comparing determines pattern peak shift between the reproducing signal waveform and an ideal isolated reproducing signal waveform and compares the amount of peak shift with peak shifts produced by different sample reproducing patterns within the range of significant intersymbol interference and determines the most likely reproducing code.

21. A peak detection method according to claim 18, wherein said comparing determines pattern peak amplitude between the reproducing signal waveform and an ideal isolated reproducing signal waveform and compares the amount of peak amplitude with peak amplitudes produced by different sample reproducing patterns within the range of significant intersymbol interference and determines the most likely reproducing code.

22. A peak detection method according to claim 16, wherein said comparing determines pattern peak amplitude between the reproducing signal waveform and an ideal isolated reproducing signal waveform and compares the amount of peak amplitude with peak amplitudes produced by different sample reproducing patterns within the range of significant intersymbol interference and determines the most likely reproducing code.

23. A peak detection method according to claim 16, wherein said comparing includes adjusting peak interval between adjacent peaks of the reproducing signal waveform to compensate for intersymbol interference within the range of significant intersymbol interference to produce an adjusted peak interval.

24. A peak detection method according to claim 23, wherein said assigning assigns bits of a first polarity to peaks and assigns a number of bits of opposite polarity between adjacent bits of first polarity in accordance with the adjusted peak interval.

25. A peak detection method according to claim 16, wherein said assigning includes judging based upon maximum-likelihood decoding.

26. A peak detection method according to claim 16, wherein said comparing determines time difference between a current peak and a preceding peak of the reproducing signal waveform and successively compares the time difference with a plurality of stored sample data correlated to a plurality of sample peak data trains, so that deviation of noise superimposed on the difference as a reference value for estimation becomes smaller than deviation of noise superimposed on an actual signal to improve signal to noise ratio; and said assigning selects a sample peak data train having a smallest comparison error.

27. A peak detection method according to claim 16, wherein said comparing determines amplitude difference between a current peak and a preceding peak of the reproducing signal waveform and successively compares the amplitude difference with a plurality of stored sample data correlated to a plurality of sample peak data trains; and said assigning selects a sample peak data train having a smallest comparison error.

28. A peak detection method according to claim 16, wherein said comparing is with respect to the range of interference including sample peaks adjacent to a center peak corresponding to the peak of the reproducing signal waveform being compared.

29. A peak detection method according to claim 16, wherein said comparing includes retrieving stored information with respect to peak shifting of ideal waveform patterns correlated to different combinations of bits in the range limited to the neighborhood of a peak of the reproducing signal waveform being compared.

30. A peak detection method according to claim 16, wherein said comparing including retrieving stored information with respect to level lowering of ideal waveform patterns correlated to different combinations of bits in the range limited to the neighborhood of a level of the reproducing signal waveform being compared.

31. A peak detection method according to claim 16, wherein said comparing includes calculating square error between actual peak characteristic data and a plurality of sample data for each peak; and said assigning determining minimum error for judging reproducing code within the range to be that corresponding to the sample data having the minimum error.

32. A peak detection method according to claim 31, wherein the minimum error is carried forth for the next step of comparing with respect to the next successive peak to prevent accumulated error from gradually increasing.

33. A peak detection method according to claim 16, wherein said comparing includes determining a time interval between peaks by integrating voltage of the reproducing signal waveform between adjacent peaks and converting integrated voltage to a digital value with analog/digital conversion.

34. A peak detection method according to claim 33, wherein said integrating and converting are parallel processing for three adjacent peak intervals, with such parallel processing being out of phase with each other to correspondingly produce out of phase outputs correlated to respective peak intervals, multiplexing the out of phase outputs to produce a single analog signal having the outputs in succession, and A/D converting the single signal into a corresponding succession of digital values correlated to the successive peak intervals of the reproducing signal waveform.

35. A method for recognizing data by peak detection of a magnetic reproducing signal, comprising:
- detecting peak information of at least one of a time interval and an amplitude level difference between sequential peaks in the reproducing signal; and
- selecting a maximum-likelihood original bit train on the basis of comprising the peak information to stored reference data representative of peak information between sequential peaks in a plurality of ideal isolated peaks having their peak information respectively adjusted for different possible bit trains within a range of electromagnetic signal interference on the recording medium.

* * * * *